United States Patent [19]

Ashdown et al.

[11] 4,348,807
[45] Sep. 14, 1982

[54] PEELING DEVICE

[76] Inventors: Raymond G. Ashdown; Barbara P. Ashdown, both of 32 Nundah St., Kedron, Queensland, 4031, Australia

[21] Appl. No.: 236,059

[22] Filed: Feb. 19, 1981

[30] Foreign Application Priority Data

Feb. 28, 1980 [AU] Australia .............................. PE 2586

[51] Int. Cl.³ .......................... A47J 17/02; B26B 7/00
[52] U.S. Cl. ...................................... 30/123.6; 30/287
[58] Field of Search ................. 30/123.5, 123.6, 123.7, 30/272, 278, 279 R, 280, 287

[56] References Cited

U.S. PATENT DOCUMENTS

| 2,958,355 | 11/1960 | Young | 30/123.5 |
| 3,292,679 | 12/1966 | Roth | 30/123.7 |
| 3,491,819 | 1/1970 | Sawrenko | 30/123.5 |
| 4,073,056 | 2/1978 | Schaeffer | 30/123.5 |
| 4,290,197 | 9/1981 | Zaroor | 30/123.7 |

Primary Examiner—Jimmy C. Peters
Attorney, Agent, or Firm—D. Paul Weaver

[57] ABSTRACT

A vegetable peeler, particularly for pumpkins, has a pair of arms made for engagement with the blade holders of the handle and motor housing of a conventional electric carving knife in place of the usual carving blades and, like the blades, releasably interconnected adjacently for relative reciprocal movement. The arms have base flanges extending laterally in opposite directions from their front parts, and with their leading edges sharpened to cutting edges for excising a strip of peel, the depth of the cut being limited by depth gauges on the two arms.

6 Claims, 5 Drawing Figures

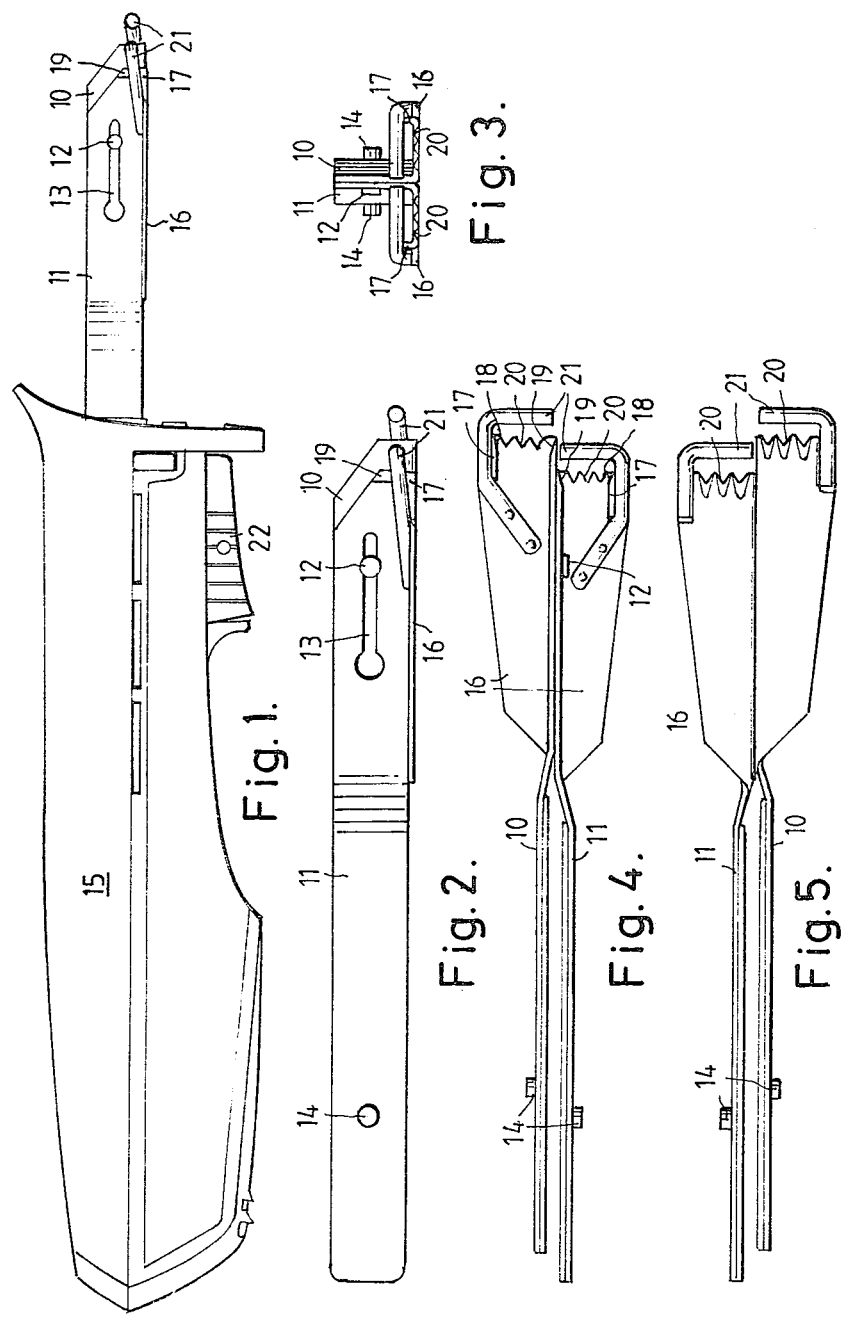

PEELING DEVICE

BACKGROUND OF THE INVENTION

This invention relates to a vegetable peeler.

Although a variety of devices are available for peeling vegetables which have peels which are fairly thin and easily cut, we are not aware of any such devices suited to the easy and convenient removal of the peels of pumpkins or other hard-peeled vegetables.

The present invention has been devised to provide such a vegetable peeler, by means of which the peel of a pumpkin for example may be quickly, easily and safely cut away.

SUMMARY OF THE INVENTION

According to the present invention, a vegetable peeler, particularly for pumpkins and the like, has a pair of arms which are releasably connected adjacently in such manner that each may be reciprocated longitudinally relative to the other. These arms are adapted to be releasably engaged at their rear ends with the blade holders of the handle and motor housing of a conventional electric carving knife, in substitution for the usual carving blades, and to be oppositely reciprocated in similar manner to the carving blades. The two arms of the vegetable peeler have co-planar base flanges extending laterally in opposite directions from their front parts, and their leading edges are sharpened to form cutting edges. A depth gauge fixed to each of the arms is located in front of and somewhat above the cutting edge of the arm. As the two arms are oppositely reciprocated by the blade holders, their cutting edges are applied to the vegetable to excise a strip of the peel, the depth of the cut being limited by the depth gauges.

BRIEF DESCRIPTION OF THE DRAWINGS

A preferred embodiment of the invention is shown in the accompanying drawings, wherein:

FIG. 1 is a side elevation of a vegetable peeler according to the invention, applied to the handle of a conventional electric carving knife in place of its usual carving blades, FIG. 2 is a side elevation, to larger scale, of the peeler detached from the carving knife handle, FIG. 3 is a front elevation of the peeler, FIG. 4 is a plan view of the peeler, and FIG. 5 is a bottom view of the peeler.

DESCRIPTION OF THE PREFERRED EMBODIMENT

The vegetable peeler illustrated includes two reciprocating arms 10 and 11, both of sheet stainless steel. The front parts of these two arms are releasably held adjacent, so that each arm is longitudinally slidable relative to the other, by a stud 12 with an enlarged head secured to the arm 10 and engaging in a longitudinal keyhole slot 13 in the arm 11.

At an intermediate position the two arms 10 and 11 are rearwardly divergent, and then continue in parallel relationship to their rear ends. These parallel rear parts of the arms 10 and 11 are reinforced by being made of two thicknesses of the sheet material secured together. Small studs 14 extend outwardly from the rear parts of the arms 10 and 11 to enable the two arms to be releasably engaged in the reciprocating blade holders (not shown) of the motor housing and handle 15 of a conventional electric carving knife of well-known type.

The front part of each of the reciprocating arms 10 and 11 is formed with an extension which is bent outwardly perpendicular to the main part of the arm, to form a base flange 16. Both base flanges 16 have small cuts formed from their outer edges, and in front of these cuts the sheet metal is bent up to form side flanges 17, the front edges of which are sharpened to form cutting edges 18. The lower parts of the front edges of the reciprocating arms 10 and 11 are also sharpened to cutting edges 19, and the leading edges of the base flanges are shaped to form serrated cutting edges 20.

A depth gauge 21 is provided for each of the reciprocating arms 10 and 11, and consists of a shaped metal rod with its rear part fixed on a base flange 16, its middle part adjacent to a side flange 17 and inclining up towards its front part, which is bent through a right angle and is located in front of and above the serrated cutting edge 20.

In use, the arms 10 and 11 are engaged in and operatively connected to the reciprocating blade holders of the electric carving knife handle 15. When the motor within the handle is operated by pressing a trigger 22, the two arms 10 and 11 are rapidly reciprocated, the one advancing as the other is retracted. The rapidly reciprocating cutters, each comprising the cutting edges 18, 19 and 20, are brought down onto the peel of a pumpkin, for example, to be peeled, and the device is pushed forward, the cutters excising a strip of the peel of the pumpkin to a depth limited by the depth gauges 21. Strips of the peel of the pumpkin are cut away in this manner until all the peel has been removed.

Although the device is particularly well suited to the rapid and convenient removal of the hard peel of vegetables such a pumpkins, it will be found to be effective for peeling many other kinds of vegetables also.

The reciprocating arms may be quickly and easily detached from the blade holders of the electric carving knife handle and may be readily separated for cleaning.

The particular embodiment of the invention herein described and illustrated may be subject to many minor modifications of constructional detail and design, for example to suit it to attachment to the blade holders of electric carving knives of different types. For this purpose, the studs 14 may be omitted and instead corresponding holes may be formed in the rear parts of the arms 10 and 11.

We claim:

1. A vegetable peeler including:
   a pair of arms interconnected adjacently for relative reciprocal movement,
   a cutter on each arm, the cutters extending laterally in opposite directions from the adjacent arms and having cutting leading edges,
   means for reciprocating the arms and the cutters thereon so one cutter is advanced as the other is retracted, and
   depth gauge means connected to the cutters for limiting their penetration into an article being peeled thereby.

2. A vegetable peeler according to claim 1 wherein:
   the means for reciprocating the arms and the cutters thereon include attachment means on the arms for releasable connection to the blade holders of an electric carving knife and motor housing.

3. A vegetable peeler according to claims 1 or 2 wherein:

two substantially co-planar base flanges extend outwardly in opposite directions from the bottoms of the two arms, and the cutters include sharpened serrated leading edges of the base flanges.

4. A vegetable peeler according to claim 3 wherein:

each cutter includes sharpened cutting edges extending substantially perpendicularly from the sides of the serrated leading edge of a base flange.

5. A vegetable peeler according to claim 3 wherein:
the depth gauge means includes a pair of transverse bars each connected to a base flange and located in front of and above a serrated leading edge of the base flange.

6. A vegetable peeler according to claim 4 wherein:
the depth gauge means includes a pair of transverse bars each connected to a base flange and located in front of and above a serrated leading edge of the base flange.

* * * * *